United States Patent [19]
Sasaki

[11] Patent Number: 5,947,195
[45] Date of Patent: Sep. 7, 1999

[54] MULTI-TUBE HEAT EXCHANGER AND AIR CONDITIONER HAVING THE SAME

[75] Inventor: Kenichi Sasaki, Isesaki, Japan

[73] Assignee: Sanden Corporation, Gunma, Japan

[21] Appl. No.: 08/880,309

[22] Filed: Jun. 24, 1997

[30] Foreign Application Priority Data

Jun. 24, 1996 [JP] Japan ................................. 8-184209

[51] Int. Cl.[6] .................................................. F28D 1/04
[52] U.S. Cl. ........................................... 165/173; 165/124
[58] Field of Search .............................. 165/65, 122, 124, 165/910, 151; 392/307

[56] References Cited

U.S. PATENT DOCUMENTS

| | | | |
|---|---|---|---|
| 1,152,328 | 8/1915 | Loring | 165/151 |
| 2,076,382 | 4/1937 | Minton | 392/307 |
| 2,893,639 | 7/1959 | Martin | 392/307 |
| 3,012,760 | 12/1961 | McGrath | 165/122 X |
| 5,157,941 | 10/1992 | Cur et al. | 62/441 |
| 5,697,435 | 12/1997 | Stickford, Jr. et al. | 165/146 |

FOREIGN PATENT DOCUMENTS

| | | | |
|---|---|---|---|
| 924332 | 8/1947 | France | 165/151 |
| 530155 | 7/1955 | Italy | 165/151 |
| 395695 | 8/1973 | U.S.S.R. | 165/910 |

*Primary Examiner*—Allen Flanigan
*Attorney, Agent, or Firm*—Baker & Botts, L.L.P.

[57] ABSTRACT

A multi-tube heat exchanger includes a pair of tanks and a plurality of heat transfer tubes fluidly interconnected between the tanks. The heat transfer tubes are arranged so that at least one of tube-arrangement surfaces formed on entrance and exit sides of the heat exchanger in a passage direction of air subjected to heat exchange is formed as two or more surfaces different from each other, and air flow is separated or joined in the multi-tube heat exchanger. An air conditioner according to the present invention has such a multi-tube heat exchanger in an air path. The multi-tube heat exchanger can be made smaller while a desired heat exchange property can be maintained. An air conditioner having such a heat exchanger also can be made smaller.

8 Claims, 6 Drawing Sheets

MULTI-TUBE HEAT EXCHANGER AND AIR CONDITIONER HAVING THE SAME

BACKGROUND OF THE INVENTION

1. Field of the Invention

The present invention relates to a multi-tube heat exchanger and an air conditioner having the same, and more particularly to a small-sized multi-tube heat exchanger and an air conditioner having the same suitable for vehicles.

2. Description of the Related Art

Figure 12:
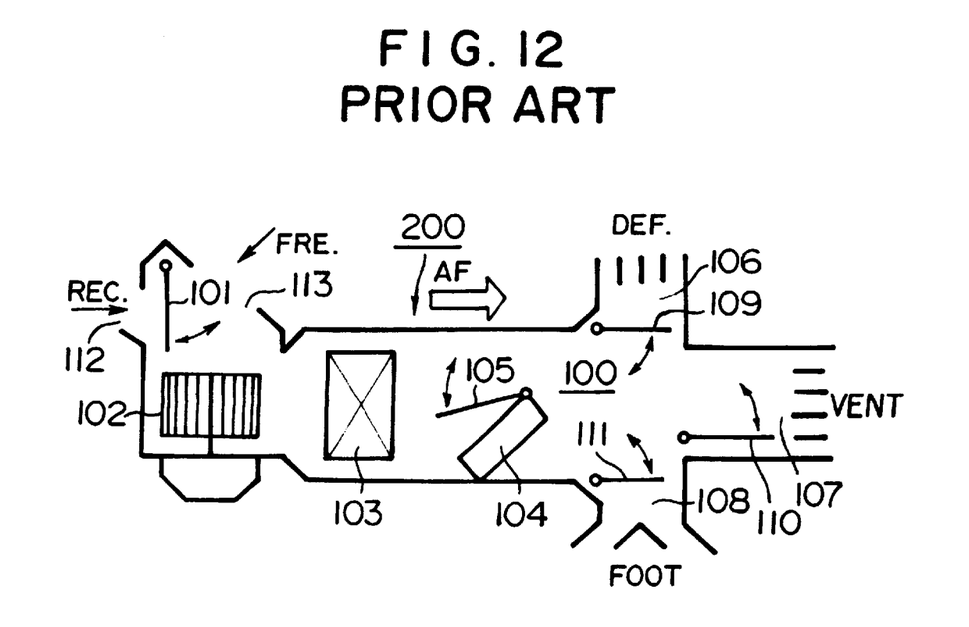
FIG. 12 is a schematic view of a conventional air conditioner.

A conventional air conditioner is depicted in FIG. 12. In FIG. 12, a path 100 for air subjected to heat exchange is formed in an air conditioner 200. The opening degrees of vehicle compartment inside air intake port 112 and vehicle compartment outside air intake port 113 are adjusted by rotary-type damper 101. Controlled inside air (REC.) and/or outside air (FRE.) are thereby introduced into air path 100 as air subjected to heat exchange.

In air path 100, a blower 102, a heat exchanger 103 and heater 104 are provided, in this order, from the upstream side to the downstream side in the passage direction of air subjected to heat exchange (i.e., the direction shown by arrow AF in FIG. 12). Damper 105 is provided between heat exchanger 103 and heater 104. The flow of the air subjected to heat exchange into heater 104 and the degree of air mixing are controlled by adjustment of damper 105. Air path 100 is diverged into discharge ports 106, 107 and 108 at positions downstream of heater 104. Dampers 109, 110 and 111 are provided between air path 100 and discharge ports 106, 107 and 108, respectively.

In such an air conditioner 200, air introduced into air path 100 through intake port 112 and/or intake port 113 passes through heat exchanger 103, and as needed, passes through heater 104, and thereafter, the air is discharged into the interior of the compartment of the vehicle through one or more discharge ports communicated with air path 100 opened selectively by operation of dampers 109, 110 and 111.

More concretely, in a cooling mode, heat exchanger 103 is operated, air flow into heater 104 is intercepted by closing damper 105, and operation of heater 104 is stopped. In a heating mode, operation of heat exchanger 103 is stopped, damper 105 is fully opened, and heater 104 is operated under a condition where the main stream of air having passed through heat exchanger 103 is directed to heater 104. In an air mixing mode, heat exchanger 103 is operated, damper 105 is semi-opened as shown in FIG. 12, and heater is operated under a condition where a part of the main stream of air passing through air path 100 is directed to heater 104. Air having passed through only heat exchanger 103 and air further having passed through heater 104 after passing through heat exchanger 103 are mixed at a position downstream of heater 104 to control the temperature of the mixed air. The controlled air is discharged through one or more discharge ports.

In the above-described air conditioner 200, a specified directivity is given to a part of, or the whole of the main stream of air subjected to heat exchange by adjustment of the opening degree of damper 105 provided in air path 100, thereby selecting a desired air conditioning mode.

However, in such a controlling mechanism where damper 105 is provided between heat exchanger 103 and heater 104, and the directivity of the main stream of air is controlled by damper 105, a space for controlling the direction of the main stream of air (in FIG. 12, a space between heat exchanger 103 and heater 104) and a space for rotational operation of damper 105 must be provided. Because of these space requirements, air path 100 is enlarged or lengthened, and ultimately, the air conditioner itself must be made large. Recently, air conditioners for vehicles are required to be made smaller, because of, for example, the development of vehicles mounted with an air bag system or/and a navigator system. A conventional air conditioner such as the above-described one cannot satisfy such a size requirement because if the air conditioner is merely formed smaller, the heat exchange property of the air conditioner is necessarily reduced.

SUMMARY OF THE INVENTION

It is an object of the present invention to provide an air conditioner which can satisfy the small size requirement while maintaining a desired heat exchange property, and a multi-tube heat exchanger suitable for such an air conditioner.

The above and other objects may be achieved by a multi-tube heat exchanger and an air conditioner having the same according to the present invention. The multi-tube heat exchanger according to the present invention includes a pair of tanks spaced from each other and a plurality of heat transfer tubes fluidly interconnected between the pair of tanks. The plurality of heat transfer tubes are arranged so that a first tube-arrangement surface is formed on an entrance side of the multi-tube heat exchanger and a second tube-arrangement surface is formed on an exit side of the multi-tube heat exchanger in a passage direction of air subjected to heat exchange. At least one of the first and second tube-arrangement surfaces is formed as two or more surfaces different from each other. Flow of the air subjected to heat exchange is separated or joined in the multi-tube heat exchanger. The air conditioner according to the present invention has such a multi-tube heat exchanger in an air path of the air conditioner.

In the multi-tube heat exchanger, at least one tube-arrangement surface is formed on an entrance and an exit side of the multi-tube heat exchanger is formed as two or more surfaces different from each other. The flow of air entering into the heat exchanger from such a tube-arrangement surface, or the flow of air flowing out from the heat exchanger through such a tube-arrangement surface, joins or separates in the heat exchanger body itself depending upon the pressure loss from the entrance side of the heat exchanger to the exit side of the heat exchanger, arrangement of the tubes in the heat exchanger, the directivity at the exit of the heat exchanger, etc. Namely, the main stream of air subjected to heat exchange enters the heat exchanger, is joined or separated in the heat exchanger, and after being directed in the heat exchanger, exits from the heat exchanger. It becomes possible to provide a desired directivity to the main stream in the heat exchanger by designing an optimum joining or separating mechanism due to arrangement of the tubes. As a result, a particular directivity controlling means, mechanism or space near a heat exchanger can be omitted.

Therefore, in the air conditioner using such a multi-tube heat exchanger, it is not necessary to provide a particular space for changing or controlling the directivity of the main stream of air subjected to heat exchange in an air path of the air conditioner and to control the directivity of the main stream in the air path. By this omission, it becomes possible to make the air path shorter or smaller, and a small-sized air conditioner can be effectively achieved maintaining a good heat exchange property.

Further, freedom of design of the heat exchanger can be increased, because the shapes of the tube-arrangement surfaces and the shape of the heat exchanger body can be changed variously depending upon requirements.

Further objects, features, and advantages of the present invention will be understood from the following detailed description of the embodiments of the present invention with reference to the appropriate figures.

BRIEF DESCRIPTION OF THE DRAWINGS

Some embodiments of the invention will now be described with reference to the appropriate figures, which are given by way of example only, and are not intended to limit the present invention.

DETAILED DESCRIPTION OF PREFERRED EMBODIMENTS

Figure 1:
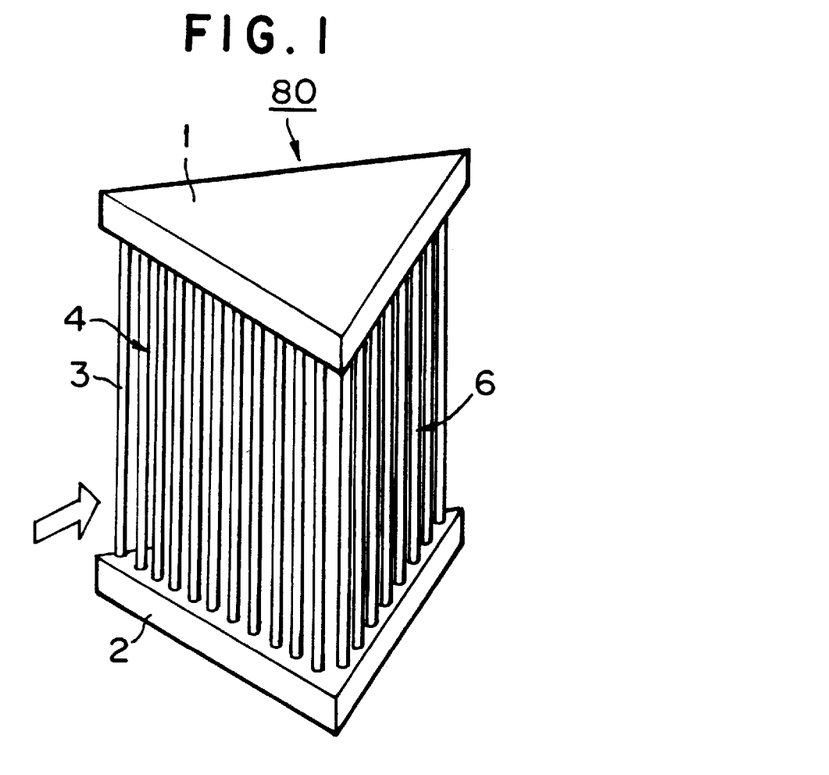
FIG. 1 is a perspective view of a multi-tube heat exchanger according to a first embodiment of the present invention.
Figure 2:
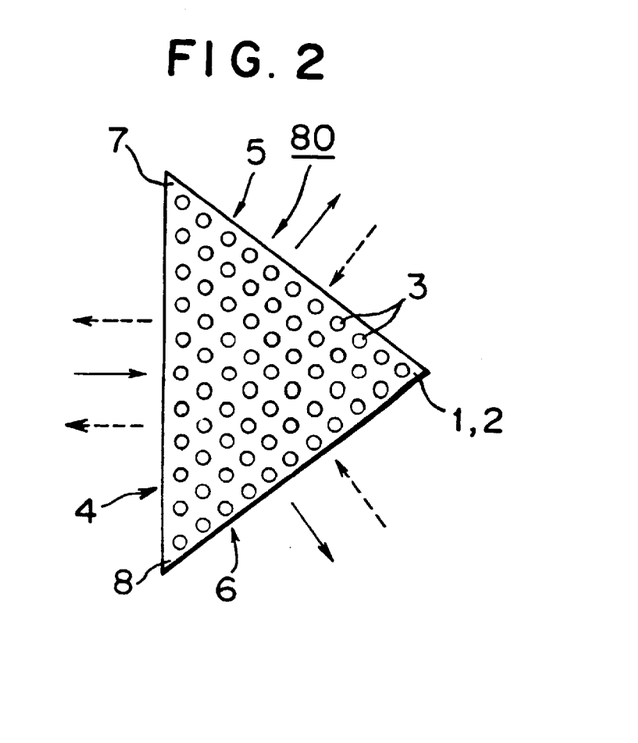
FIG. 2 is a cross-sectional view of the heat exchanger depicted in FIG. 1.

Referring to FIGS. 1 and 2, a multi-tube heat exchanger 80 is provided according to a first embodiment of the present invention. Heat exchanger 80 includes a pair of tanks 1 and 2, for example, an upper tank 1 and a lower tank 2. A plurality of heat transfer tubes 3 (for example, refrigerant tubes having a circular cross section) are fluidly interconnected between tanks 1 and 2. Thus, heat exchanger 80 is formed as a multi-tube heat exchanger.

In this embodiment, the plurality of heat transfer tubes 3 are arranged to form a triangular cross section as shown in FIG. 2. Three tube-arrangement surfaces 4, 5 and 6 are formed by the heat transfer tubes 3 interconnected between tanks 1 and 2. Air subjected to heat exchange is sent in a direction shown by the arrow in FIG. 1. Tube-arrangement surface 4 is formed on the entrance side of the air of heat exchanger 80 and tube-arrangement surfaces 5 and 6, different from each other, are formed on the air exit side of heat exchanger 80.

In such an arrangement of tubes 3 in heat exchanger 80, as viewed along the passage direction of air subjected to heat exchange, the number of arranged tubes 3 on a central portion of tube-arrangement surface 4 is greater, and the number of arranged tubes 3 on a portion of tube-arrangement surface 4 approaching end portion 7 or 8 of the tube-arrangement surface 4 is gradually smaller. Therefore, the main stream of the air having entered into heat exchanger 80 from tube-arrangement surface 4 is diverged from the central portion and provided with directivities toward the sides of end portions 7 and 8 because a pressure loss in the heat exchanger 80 is smaller in these directions. As a result, the main stream of the air provided with directivities diverges mainly into two streams, and the diverged streams flow out from tube-arrangement surfaces 5 and 6, respectively, as shown by solid-line arrows in FIG. 2. Thus, the air subjected to heat exchange and passing through heat exchanger 80 is separated into two streams in the heat exchanger body itself without using a particular exterior means.

Alternatively, tube-arrangement surfaces 5 and 6 may be disposed on an entrance side, and tube-arrangement surface 4 may be disposed on an exit side, as shown by dotted-line arrows in FIG. 2. In this case, the air having entered into heat exchanger 80 from tube-arrangement surfaces 5 and 6 is provided with a directivity bending toward end portions 7 and 8 so as to approach the end portions 7 and 8 each having a smaller pressure loss in the heat exchanger 80. As a result, the flows of air having entered from tube-arrangement surfaces 5 and 6 are joined in heat exchanger 80, the direction of the flow of the joined main stream is changed, and the joined air flows out from tube-arrangement surface 4 as a substantially parallel flow.

Figure 3:
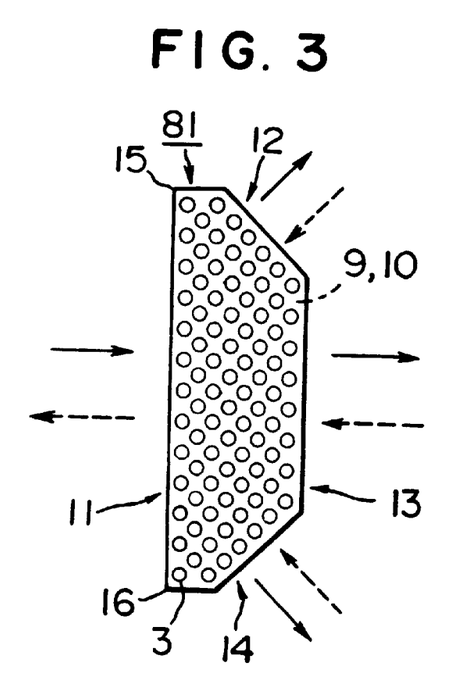
FIG. 3 is a cross-sectional view of a multi-tube heat exchanger according to a second embodiment of the present invention.

FIG. 3 depicts a multi-tube heat exchanger 81 according to a second embodiment of the present invention. In this embodiment, a pair of tanks 9 and 10 are trapezoidal in shape, and a plurality of heat transfer tubes 3 fluidly interconnected between tanks 9 and 10 are arranged to form a trapezoidal cross section on one of the entrance and exit sides of heat exchanger 81 in a passage direction of air subjected to heat exchange. The plurality of heat transfer tubes 3 form four tube-arrangement surfaces 11, 12, 13 and 14. In a case where air flows as shown by solid-line arrows in FIG. 3, tube-arrangement surface 11 is disposed on the entrance side and tube-arrangement surfaces 12, 13 and 14 are disposed on the exit side.

In this case, as viewed along the passage direction of air subjected to heat exchange, the number of arranged tubes 3 on a central portion of tube-arrangement surface 11 is greater, and the number of arranged tubes 3 on a portion of tube-arrangement surface 11 approaching end portion 15 or 16 of the tube-arrangement surface 11 is gradually smaller because of the formation of tube-arrangement surfaces 12 and 14. Therefore, a part of the main stream of the air having entered into heat exchanger 81 from tube-arrangement surface 11 is provided with directivities toward the sides of tube-arrangement surfaces 12 and 14 because the pressure loss in these directions is smaller. As a result, the main stream of the air diverges mainly into three streams, and the diverged streams flow out from tube-arrangement surfaces 12, 13 and 14, respectively, as shown by solid-line arrows in FIG. 3. Thus, the air subjected to heat exchange and passing through heat exchanger 81 is separated into three streams in the heat exchanger body itself without using a particular exterior means.

Alternatively, tube-arrangement surfaces 12, 13 and 14 may be disposed on an entrance side, and tube-arrangement surface 11 may be disposed on an exit side, as shown by dotted-line arrows in FIG. 3. In this case, the air having entered into heat exchanger 81 from tube-arrangement surfaces 12 and 14 is provided with a directivity bending toward end portions 15 and 16 so as to approach the end portions 15 and 16 each having a smaller pressure loss in the heat exchanger 81. As a result, the flows of air having entered from tube-arrangement surfaces 12, 13 and 14 are joined in heat exchanger 81, the directions of the air flows are changed, particularly, the direction of the air flows from tube-arrangement surfaces 12 and 14, and the joined air flows out from tube-arrangement surface 11 as a substantially parallel flow.

Figure 4:
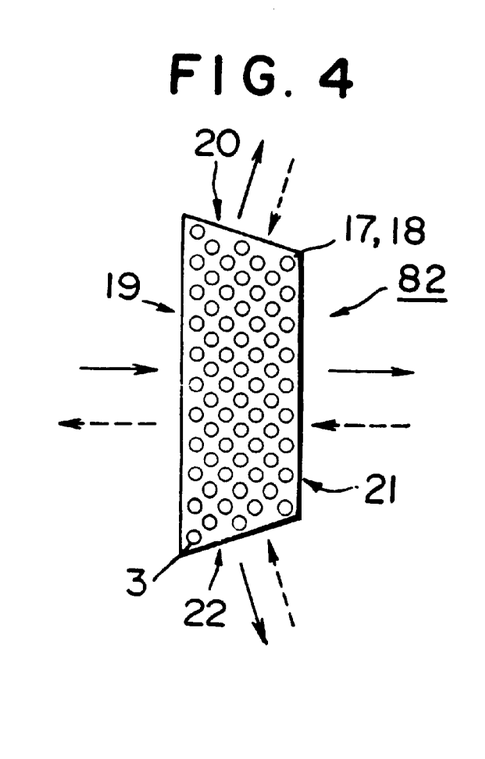
FIG. 4 is a cross-sectional view of a multi-tube heat exchanger according to a third embodiment of the present invention.

FIG. 4 depicts a multi-tube heat exchanger 82 according to a third embodiment of the present invention. In this embodiment, a pair of tanks 17 and 18 are trapezoidal in shape, and a plurality of heat transfer tubes 3 fluidly interconnected between tanks 17 and 18 are arranged to form a trapezoidal cross section on one of the entrance and exit sides of heat exchanger 82 in a passage direction of air subjected to heat exchange. The plurality of heat transfer tubes 3 form four tube-arrangement surfaces 19, 20, 21 and 22. In a case where air flows as shown by solid-line arrows in FIG. 4, tube-arrangement surface 19 is disposed on the entrance side and tube-arrangement surfaces 20, 21 and 22 are disposed on the exit side. In this case, similarly to the above-described second embodiment, a part of the main stream of the air having entered into heat exchanger 82 from tube-arrangement surface 19 is diverged mainly into three streams in the heat exchanger 82, and the diverged streams flow out from tube-arrangement surfaces 20, 21 and 22, respectively, as shown by solid-line arrows in FIG. 4. Thus, the air subjected to heat exchange and passing through heat exchanger 82 is separated into three streams in the heat exchanger body itself without using a particular exterior means.

Alternatively, tube-arrangement surfaces 20, 21 and 22 may be disposed on an entrance side, and tube-arrangement surface 19 may be disposed on an exit side, as shown by dotted-line arrows in FIG. 4. In this case, the air having entered into heat exchanger 82 from tube-arrangement surfaces 20, 21 and 22 are joined in heat exchanger 82, and the joined air flows out from tube-arrangement surface 19 as a substantially parallel flow.

Figure 5:
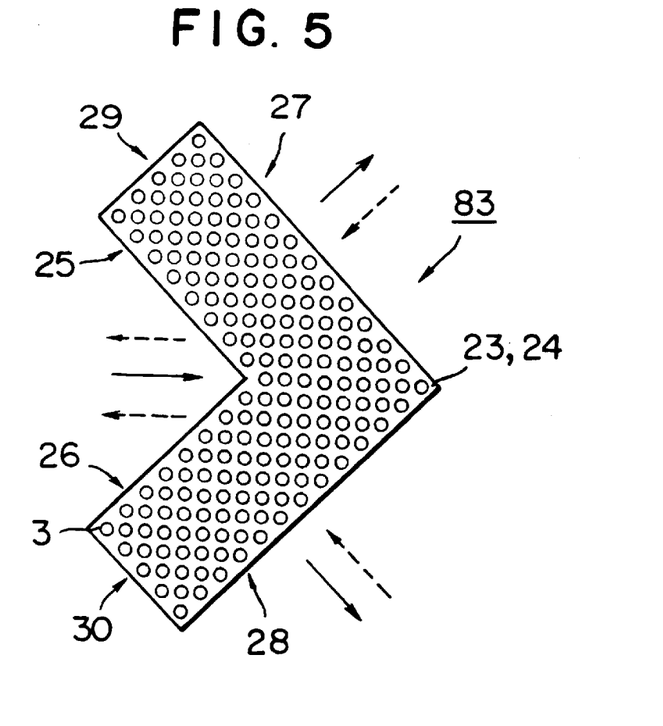
FIG. 5 is a cross-sectional view of a multi-tube heat exchanger according to a fourth embodiment of the present invention.

FIG. 5 depicts a multi-tube heat exchanger 83 according to a fourth embodiment of the present invention. In this embodiment, a pair of tanks 23 and 24 have an L-shaped cross section, and a plurality of heat transfer tubes 3, fluidly interconnected between tanks 23 and 24, are arranged to form an L-shaped cross section so that the corner of the L-shape projects toward one of the entrance and exit sides of heat exchanger 83 in a passage direction of air subjected to heat exchange. The plurality of heat transfer tubes 3 form four tube-arrangement surfaces 25, 26, 27 and 28. In a case where air flows as shown by solid-line arrows in FIG. 5, tube-arrangement surfaces 25 and 26 are disposed on the entrance side and tube-arrangement surfaces 27 and 28 are disposed on the exit side.

In this case, directivities are provided to the air having entered into heat exchanger 83 from tube-arrangement surfaces 25 and 26 to flow from a central portion (boundary portion between tube-arrangement surfaces 25 and 26 and the vicinity thereof) having a greater pressure loss (between heat exchanger entrance and exit) toward portions approaching end portions 29 and 30 which have a smaller pressure loss. Further, the arrangement of tubes 3 of an L-shaped cross section provides similar directivities to the air flow in heat exchanger 83. As a result, the main stream of the air diverges mainly into two streams, and the diverged streams flow out from tube-arrangement surfaces 27 and 28, respectively, as shown by solid-line arrows in FIG. 5. Thus, the air subjected to heat exchange and passing through heat exchanger 83 is separated into two streams in the heat exchanger body itself without using a particular exterior means.

Alternatively, tube-arrangement surfaces 27 and 28 may be disposed on an entrance side, and tube-arrangement surfaces 25 and 26 may be disposed on an exit side, as shown by dotted-line arrows in FIG. 5. In this case, the air having entered into heat exchanger 83 from tube-arrangement surfaces 27 and 28 is provided with a directivity modifying the flow to a parallel flow. As a result, the flows of air having entered from tube-arrangement surfaces 27 and 28 are joined in heat exchanger 83, the directions of the air flows are changed to a parallel flow, and the joined air flows out from tube-arrangement surfaces 25 and 26.

Figure 6:
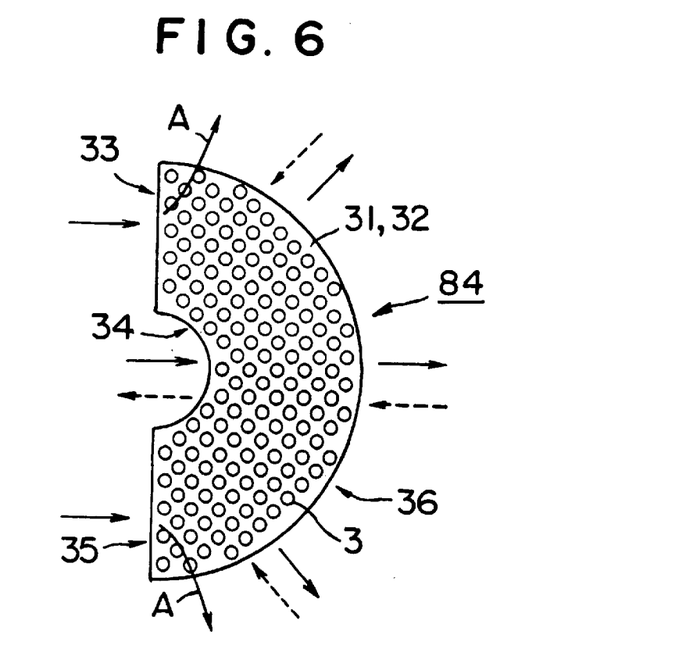
FIG. 6 is a cross-sectional view of a multi-tube heat exchanger according to a fifth embodiment of the present invention.

FIG. 6 depicts a multi-tube heat exchanger 84 according to a fifth embodiment of the present invention. In this embodiment, a pair of tanks 31 and 32 are semi-annular or arcuate in cross section, and a plurality of heat transfer tubes 3 fluidly interconnected between tanks 31 and 32 are arranged to form a semi-annular or arcuate cross section. The plurality of heat transfer tubes 3 form four tube-arrangement surfaces 33, 34, 35 and 36. Tube-arrangement surfaces 34 and 36 are formed as arcuated shapes. In a case where air flows as shown by solid-line arrows in FIG. 6, tube-arrangement surfaces 33, 34 and 35 are disposed on the entrance side and tube-arrangement surface 36 is disposed on the exit side.

In this case, directivities are provided to the air having entered into heat exchanger 83 from tube-arrangement surfaces 33, 34 and 35, particularly, from tube-arrangement surfaces 33 and 35, to flow in short paths having a smaller pressure loss, as shown by arrows A in FIG. 6. The air flows at other portions are similar to the air flows shown by arrows A, directivities are provided to the air having entered into heat exchanger 84 so that the air flow expands radially and the air provided with the radial directivities flows out from tube-arrangement surface 36. Namely, the main stream of the air subjected to heat exchange and passing through heat exchanger 84 is diverged into many directions (radially) in the heat exchanger body itself without using a particular exterior means. Such a structure is suitable, particularly in a case where heat exchanger 84 is a cooling device and an air conditioner having the heat exchanger 84 is used as a cooler, because the air cooling area in the heat exchanger 84 is enlarged and the cooled air flows out uniformly and broadly.

Alternatively, tube-arrangement surface 36 may be disposed on an entrance side, and tube-arrangement surfaces 33, 34 and 35 (or only tube-arrangement surface 34) may be disposed on an exit side, as shown by dotted-line arrows in FIG. 6. In this case, the air having entered into heat exchanger 84 from tube-arrangement surface 36 is provided with a directivity modifying the flow to a parallel flow or a directivity toward tube-arrangement surface 34. As a result, the flows of air having entered from various radial directions through tube-arrangement surface 36 are joined in heat exchanger 84, the directions of the air flows are changed to a parallel flow and the joined air flows out from tube-arrangement surfaces 33, 34 and 35 (or only from tube-arrangement surface 34). In this case, the surface for introducing air into heat exchanger 84 (tube-arrangement surface 36) is enlarged, and the air cooling area in heat exchanger 84 is enlarged, thereby increasing the heat exchange ability.

Figure 7:
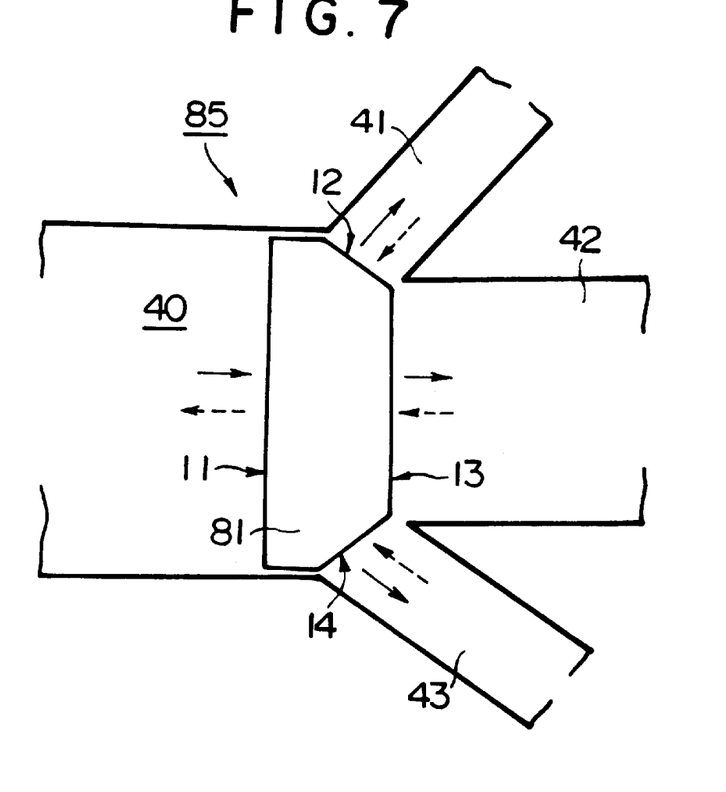
FIG. 7 is a schematic view of an air conditioner according to a sixth embodiment of the present invention.

FIG. 7 depicts an air conditioner 85 according to a sixth embodiment of the present invention. An air path 40 for air subjected to heat exchange is formed in air conditioner 85, and multi-tube heat exchanger 81 explained using FIG. 3 is provided in air path 40. In this embodiment, air path 40 is diverged into three paths 41, 42 and 43, and the respective diverged paths 41, 42 and 43 are opened toward respective tube-arrangement surfaces 12, 13 and 14 of heat exchanger 81.

In such an air conditioner 85, in a case where air is introduced into heat exchanger 81 from tube-arrangement surface 11, the air flow is separated into three flows in heat exchanger 81 as described in the second embodiment. The separated air flows are discharged from tube-arrangement surfaces 12, 13 and 14 into diverged paths 41, 42 and 43, respectively, as shown by solid-line arrows in FIG. 7. Such a structure is effective particularly for a case where heat exchanger 81 is a cooling device and air conditioner 85 having the heat exchanger 81 is used as a cooler, because the air cooling area in the heat exchanger 81 can be enlarged and the cooled air can be efficiently diverged in a plurality of appropriate directions and flown out into a plurality of appropriate air paths.

Alternatively, air may be introduced into heat exchanger 81 from air paths 41, 42 and 43, and the air after heat exchange may be discharged into air path 40, as shown by dotted-line arrows in FIG. 7. In this case, the air flows from air paths 41, 42 and 43 are efficiently joined in heat exchanger 81, the joined air flows out as a uniform air flow, and increases the heat exchange ability of heat exchanger 81.

Therefore, in this embodiment, air subjected to heat exchange is appropriately and easily separated or joined without providing a particular space for the separating or joining, and the air path is formed smaller or shorter, and, ultimately, air conditioner 85 is formed smaller.

Figure 8:
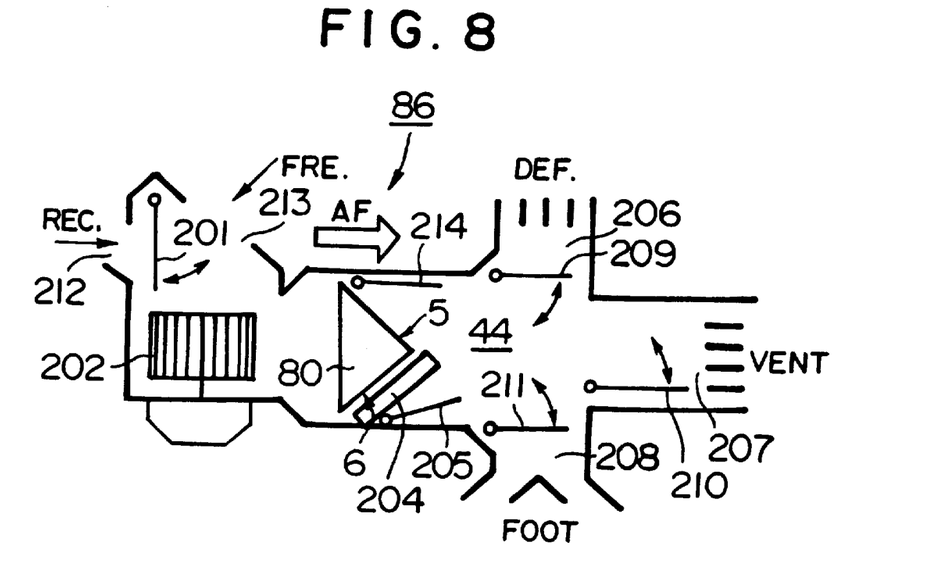
FIG. 8 is a schematic view of an air conditioner according to a seventh embodiment of the present invention.

FIG. 8 depicts an air conditioner 86 according to a seventh embodiment of the present invention. An air path 44 for air subjected to heat exchange is formed in air conditioner 86, and multi-tube heat exchanger 80 explained using FIGS. 1 and 2 is provided in air path 44. A heater 204 is disposed at a position downstream of heat exchanger 80 so as to confront tube-arrangement surface 6 of heat exchanger 80. A damper 205 for controlling the flow of air passing through heater 204 is provided at a position downstream of heater 204. A damper 214 for controlling the flow of air from tube-arrangement surface 5 of heat exchanger 80 is provided so as to be able to adjust the opening degree of tube-arrangement surface 5. Other structural members are constituted similarly to those of the conventional air conditioner shown in FIG. 12. The opening degrees of vehicle compartment inside air intake port 212 and vehicle compartment outside air intake port 213 are adjusted by rotary-type damper 201, and controlled inside air (REC.) and/or outside air (FRE.) are introduced into air path 44 as air subjected to heat exchange. Air path 44 is diverged into discharge ports 206, 207 and 208 at positions downstream of heater 204. Dampers 209, 210 and 211 are provided between air path 44 and discharge ports 206, 207 and 208, respectively.

In this embodiment, the main stream of air introduced into air path 44 and flowing in a direction shown by the arrow AF flows into heat exchanger 80. In a case where dampers 205 and 214 are opened, the air flow is separated into two flows in heat exchanger 80, that is, an air flow flowing out from tube-arrangement surface 6 after passing through heat exchanger 80 and further passing through heater 204 and an air flow flowing out from tube-arrangement surface 5 after passing through heat exchanger 80 which does not pass through heater 204. Therefore, the air passing through heat exchanger 80 is separated efficiently and appropriately in heat exchanger 80 itself without providing a particular space and a particular device for controlling the air flow. As a result, air path 44 is shortened and the whole of air conditioner 86 is formed smaller, as compared with the conventional air conditioner shown in FIG. 12. In a case where damper 205 is closed and damper 214 is opened (mainly in a cooling mode), air passing through heat exchanger 80 flows out from only tube-arrangement surface 5. In a case where damper 214 is closed and damper 205 is opened (mainly in a heating mode), air passing through heat exchanger 80 flows out from only tube-arrangement surface 6. In a case where both dampers 205 and 214 are opened (mainly in an air mixing mode), air passing through heat exchanger 80 separates into two flows and the respective flows are discharged from the respective tube-arrangement surfaces 5 and 6 at the respective desired and controlled flow rates.

Figure 9:
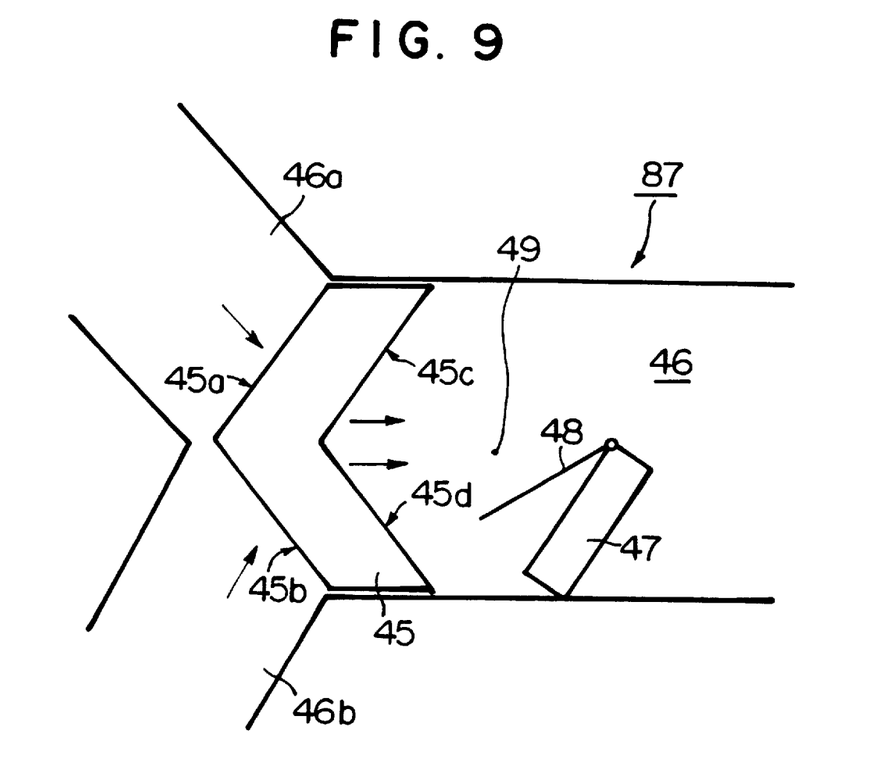
FIG. 9 is a schematic view of an air conditioner according to an eighth embodiment of the present invention.

FIG. 9 depicts an air conditioner 87 according to an eighth embodiment of the present invention. In this embodiment, a heat exchanger 45 having a structure equivalent or similar to that of the aforementioned heat exchanger 83 is disposed in air path 46. Air path 46 is diverged into two paths 46a and 46b confronting respective tube-arrangement surfaces 45a and 45b of heat exchanger 45 at a position upstream of heat exchanger 45. Air path 46 is formed as a single path at a position downstream of heat exchanger 45 so that tube-arrangement surfaces 45c and 45d of heat exchanger 45 confront air path 46. Heater 47 is disposed at a position downstream of heat exchanger 45, and damper 48 is disposed at a position upstream of heater 47 for controlling the flow of air passing through heater 47.

In such an air conditioner 87, since the cross section of heat exchanger 45 is formed as an L-shape projecting toward upstream side, and the entrance side of heat exchanger 45 is formed from two tube-arrangement surfaces 45a and 45b, the area of the entrance side is enlarged. Therefore, particularly in a case where heat exchanger 45 is a cooling device, the cooling ability of air conditioner 87 is increased. Further, since tube-arrangement surfaces 45c and 45d are formed so as to be folded toward upstream side, a space 49 is defined at a position immediately downstream of tube-arrangement surfaces 45c and 45d. This space 49 can be utilized as a space for operation of damper 48. Therefore, even if the distance between heat exchanger 45 and heater 47 is designed relatively short, damper 48 is easily disposed at a position upstream of heater 47 and damper 48 is easily operated properly. The short distance realizes a short air path 46, and ultimately, the whole of air conditioner 87 can be made smaller.

As described hereinabove, since the heat exchanger according to the present invention employs various shapes in cross section, the freedom of design for the heat exchanger is increased. Further, the heat exchanger can be disposed efficiently in a limited space of an air path of an air conditioner.

Further, in the heat exchanger according to the present invention and the air conditioner having the same, it is possible to unify the distribution of flow rate of air passing in an air path.

Figure 10:
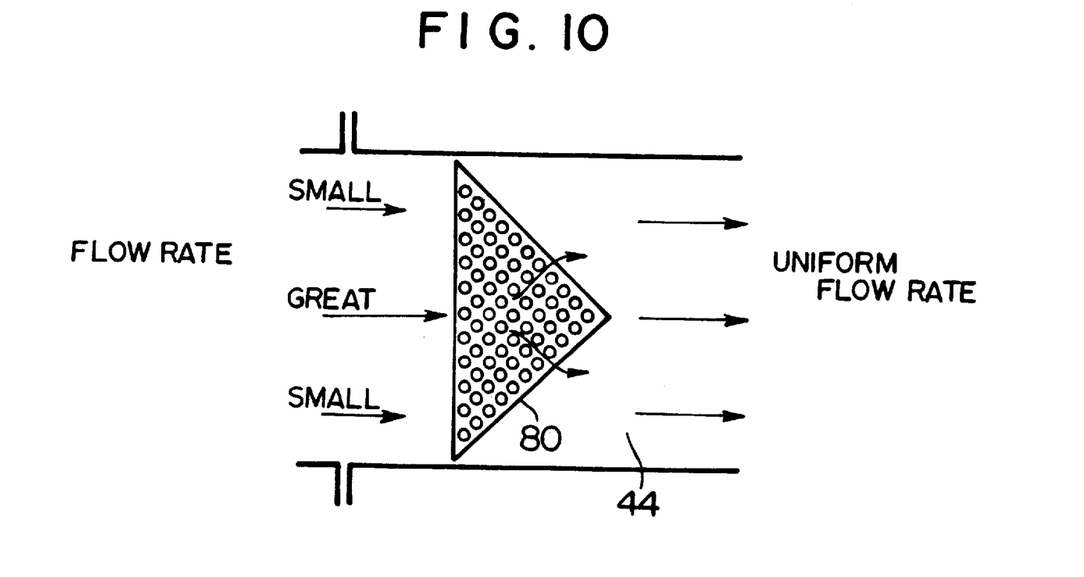
FIG. 10 is a schematic view of an air conditioner according to a ninth embodiment of the present invention, showing an example of unifying an air flow.

For example, a ninth embodiment of the present invention is depicted in FIG. 10 as an example using a multi-tube heat exchanger 80 having a triangular cross section. In the entrance side of heat exchanger 80, the distribution of flow rate indicates that the flow rate at a central portion of the cross section of air path 44 is greater and flow rates of wall sides are smaller due to contact resistance with the walls. In the exit side of heat exchanger 80, a uniform distribution of flow rate is indicated by the separating action of air stream in heat exchanger 80 aforementioned. Such a uniform flow rate of air subjected to heat exchange contributes to enabling heat exchanger 80 to indicate the maximum heat exchange ability, thereby contributing improvement of the performance of an air conditioner using the heat exchanger 80.

Figure 11:
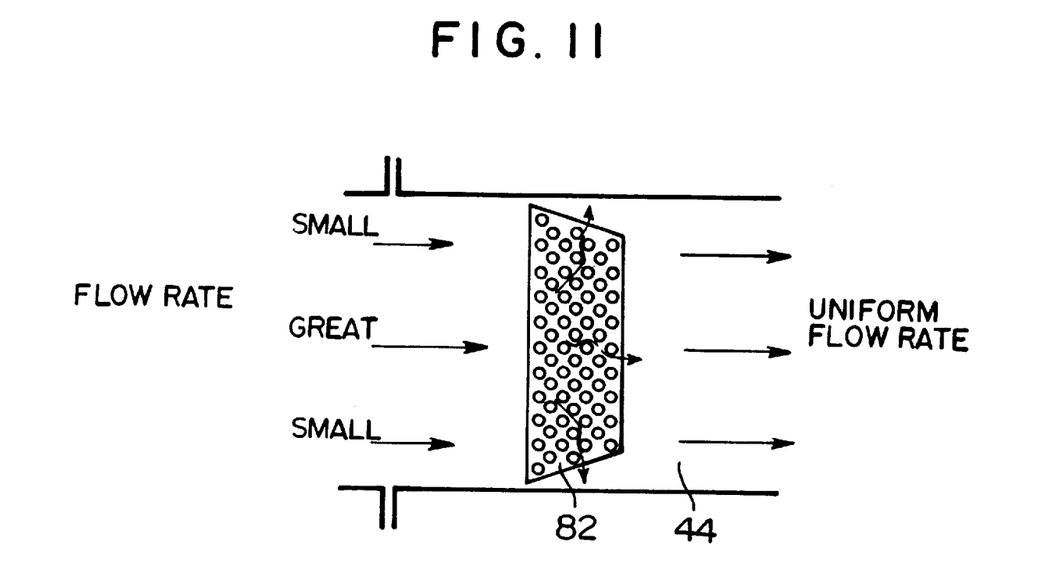
FIG. 11 is a schematic view of an air conditioner according to a tenth embodiment of the present invention, showing another example of unifying an air flow.

FIG. 11 depicts a tenth embodiment of the present invention showing another example with similar advantage. In this embodiment, multi-tube heat exchanger 82 having a trapezoidal cross section is disposed in air path 44. Also in this case, varying air flow rates at the entrance side of heat exchanger 82 can be made uniform at the exit side of heat exchanger 82 by the separating action of air stream in heat exchanger 82. Therefore, the heat exchange ability of heat exchanger 82 is increased, and the performance of an air conditioner using the heat exchanger 82 is improved.

Although several embodiments of the present invention have been described in detail herein, the scope of the invention is not limited thereto. It will be appreciated by those skilled in the art that various modifications may be made without departing from the scope of the invention. Accordingly, the embodiments disclosed herein are only exemplary. It is to be understood that the scope of the invention is not to be limited thereby, but is to be determined by the claims which follow.

What is claimed is:

1. A heat exchanger system comprising:
   a housing, said housing defining a plurality of inlet or outlet streams for air flow;
   a multi-tube heat exchanger disposed in said housing, said multi-tube heat exchanger having an entrance side at the inlet of said housing and an exit side at the outlet of said housing, said entrance side and said exit side in a passage direction of air subjected to heat exchange, said multi-tube heat exchanger comprising:
   a pair of tanks spaced from each other; and
   a plurality of heat transfer tubes fluidly interconnected between said pair of tanks, said plurality of heat transfer tubes being arranged so that a first tube-arrangement surface is formed on the entrance side of said multi-tube heat exchanger and a second tube-arrangement surface is formed on the exit side of said multi-tube heat exchanger, at least one of said first and second tube-arrangement surfaces being formed as two or more surfaces different from each other, and wherein the air flow subjected to heat exchanger is separated or joined in said multi-tube heat exchanger.

2. The heat exchanger system of claim 1, wherein each of said plurality of heat transfer tubes has a circular section.

3. The heat exchanger system of claim 1, wherein said plurality of heat transfer tubes are arranged to form a triangular cross section.

4. An air conditioner comprising:
   a housing, said housing defining a plurality of inlet or outlet streams for air flow;
   a multi-tube heat exchanger disposed in an air path of said housing, said multi-tube heat exchanger having an entrance side at the inlet of said housing and an exit side at the outlet of said housing, said entrance side and said exit side in a passage direction of air path of said housing, said multi-tube heat exchanger comprising:
   a pair of tanks spaced from each other; and
   a plurality of heat transfer tubes fluidly interconnected between said pair of tanks, said plurality of heat transfer tubes being arranged so that a first tube-arrangement surface is formed on the entrance side of said multi-tube heat exchanger and a second tube-arrangement surface is formed on the exit side of said multi-tube heat exchanger, at least one of said first and second tube arrangement surfaces being formed as two or more surfaces different from each other, and wherein flow of said air subjected to heat exchange is separated or joined in said multi-tube heat exchanger.

5. The air conditioner of claim 4, wherein each of said plurality of heat transfer tubes has a circular section.

6. The air conditioner of claim 4, wherein said plurality of heat transfer tubes are arranged to form a triangular cross section.

7. The air conditioner of claim 6, wherein two tube-arrangement surfaces different from each other are formed on an exit side of said multi-tube heat exchanger in said air passage direction.

8. The air conditioner of claim 7, wherein a heater is disposed at a position downstream of one of said two tube-arrangement surfaces so that said heater confronts said one of said two tube-arrangement surfaces.

* * * * *